US010282362B2

(12) United States Patent
Kambaloor et al.

(10) Patent No.: US 10,282,362 B2
(45) Date of Patent: May 7, 2019

(54) METHODS AND SYSTEMS FOR INFORMATION STORES TRANSFORMATION

(71) Applicant: Wipro Limited, Bangalore (IN)

(72) Inventors: Guruprasad Nagaraja Kambaloor, Bangalore (IN); Sudha Shantharam, Bangalore (IN)

(73) Assignee: Wipro Limited, Bangalore (IN)

( * ) Notice: Subject to any disclaimer, the term of this patent is extended or adjusted under 35 U.S.C. 154(b) by 485 days.

(21) Appl. No.: 14/982,376

(22) Filed: Dec. 29, 2015

(65) Prior Publication Data

US 2017/0124165 A1    May 4, 2017

(30) Foreign Application Priority Data

Nov. 4, 2015   (IN) ............................ 5968/CHE/2015

(51) Int. Cl.
| | |
|---|---|
| *G06F 16/00* | (2019.01) |
| *G06F 16/25* | (2019.01) |
| *G06F 16/955* | (2019.01) |
| *G06Q 10/06* | (2012.01) |

(52) U.S. Cl.
CPC .......... *G06F 16/258* (2019.01); *G06F 16/955* (2019.01); *G06Q 10/067* (2013.01)

(58) Field of Classification Search
None
See application file for complete search history.

(56) References Cited

U.S. PATENT DOCUMENTS

| | | | |
|---|---|---|---|
| 7,890,545 B1* | 2/2011 | Cason, Jr. .............. | G06Q 10/06 707/803 |
| 2008/0249825 A1* | 10/2008 | Kunjur .............. | G06Q 10/0637 705/7.36 |
| 2011/0066570 A1* | 3/2011 | Kolo ...................... | G06Q 40/06 705/36 R |
| 2013/0159387 A1* | 6/2013 | James .............. | G06F 17/30887 709/203 |

\* cited by examiner

*Primary Examiner* — Bai D Vu
(74) *Attorney, Agent, or Firm* — Pepper Hamilton LLP

(57) ABSTRACT

This disclosure relates generally to information stores and more particularly to methods and systems for information stores transformation. The method includes capturing an existing state of the portfolio of information stores used by the enterprise. The method further includes creating a rationalization model to assess at least one of business entity information and a data store based on the existing state and at least one rationalization criterion; and identify at least one dimension of interest associated with the at least one of business entity information and the data store. Thereafter, the method includes assigning scores to each of the at least business entity information and the data store across each of the at least one dimension of interest. Finally, the method includes generating a transformation road-map for the portfolio of information stores based on the scores.

19 Claims, 4 Drawing Sheets

METHODS AND SYSTEMS FOR INFORMATION STORES TRANSFORMATION

This application claims the benefit of Indian Patent Application Serial No. 5968/CHE/2015 filed Nov. 4, 2015, which is hereby incorporated by reference in its entirety.

TECHNICAL FIELD

This disclosure relates generally to information stores and more particularly to methods and systems for information stores transformation.

BACKGROUND

Data storage has increased by leaps and bounds within organizations. As a result, storage is growing exponentially and databases/data storage mechanisms have proliferated both in numbers and variety. Organizations/enterprises may use different types of databases, for example, Online Transaction Processing (OLTP) databases, analytic structures, such as Data Warehouses, dependent data marts, Operational Data Stores (ODS), independent data marts, de-normalized databases for reporting, replicated databases, and Online Analytical Processing (OLAP) servers across various subject areas and business processes. These databases may grow into various types and size over a period of time, leading to complexity in managing databases as well as information stored on these databases, thereby requiring rationalization.

In conventional methods, assessments for rationalization are performed manually or through Excel based sheets. However, these methods do not apply an objective approach towards data and database rationalization. As a result, the assessment is not optimal from the perspective of an enterprise or organization. Moreover, as the assessments are done manually, they are time consuming and thus fail to provide proper assessment in a desired time frame.

SUMMARY

In one embodiment, method for transforming a portfolio of information stores is disclosed. The method includes capturing, via a transforming device, an existing state of the portfolio of information stores used by the enterprise; creating, via the transforming device, a rationalization model to: assess at least one of business entity information and a data store based on the existing state and at least one rationalization criterion; and identify at least one dimension of interest associated with the at least one of business entity information and the data store; assigning, via the transforming device, scores to each of the at least business entity information and the data store across each of the at least one dimension of interest; and generating, via the transforming device, a transformation road-map for the portfolio of information stores based on the scores.

In another embodiment, a system for rationalizing a portfolio of assets is disclosed. The system includes at least one processors and a computer-readable medium. The computer-readable medium stores instructions that, when executed by the at least one processor, cause the at least one processor to perform operations that include capturing an existing state of the portfolio of information stores used by the enterprise; creating a rationalization model to: assess at least one of business entity information and a data store based on the existing state and at least one rationalization criterion; and identify at least one dimension of interest associated with the at least one of business entity information and the data store; assigning scores to each of the at least business entity information and the data store across each of the at least one dimension of interest; and generating a transformation road-map for the portfolio of information stores based on the scores.

In yet another embodiment, a non-transitory computer-readable storage medium for rationalizing a portfolio of assets is disclosed, which when executed by a computing device, cause the computing device to: capture an existing state of the portfolio of information stores used by the enterprise; create a rationalization model to: assess at least one of business entity information and a data store based on the existing state and at least one rationalization criterion; and identify at least one dimension of interest associated with the at least one of business entity information and the data store; assign scores to each of the at least business entity information and the data store across each of the at least one dimension of interest; and generate a transformation road-map for the portfolio of information stores based on the scores.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
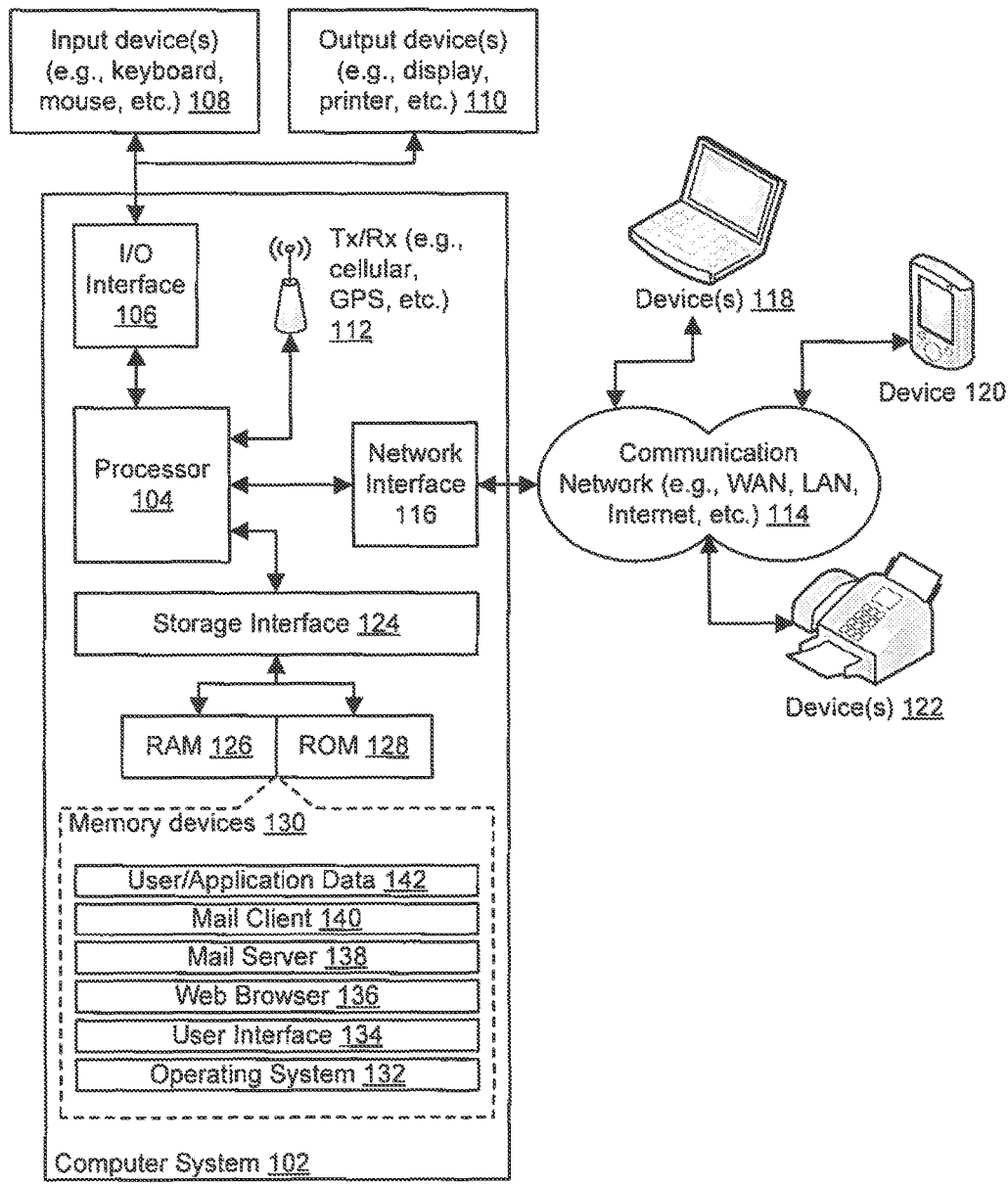
FIG. 1 illustrates a block diagram of an exemplary computer system for implementing various embodiments.

Additional illustrative embodiments are listed below. In one embodiment, a block diagram of an exemplary computer system for implementing various embodiments is disclosed in FIG. 1. Computer system 102 may comprise a central processing unit ("CPU" or "processor") 104. Processor 104 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 104 may be disposed in communication with one or more input/output (I/O) devices via an I/O interface 106. I/O interface 106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 106, computer system 102 may communicate with one or more I/O devices. For example, an input device 108 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 110 may be a printer, fax machine, video display (e.g., cathode ray tube (CRT), liquid crystal display (LCD), light-emitting diode (LED), plasma, or the like), audio speaker, etc. In some embodiments, a transceiver 112 may be disposed in connection with processor 104. Transceiver 112 may facilitate various types of wireless transmission or reception. For example, transceiver 112 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 104 may be disposed in communication with a communication network 114 via a network interface 116. Network interface 116 may communicate with communication network 114. Network interface 116 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 114 may include, without limitation, a direct interconnection, local area network (LAN), wide area network (WAN), wireless network (e.g., using Wireless Application Protocol), the Internet, etc. Using network interface 116 and communication network 114, computer system 102 may communicate with devices 118, 120, and 122. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 102 may itself embody one or more of these devices.

In some embodiments, processor 104 may be disposed in communication with one or more memory devices (e.g., RAM 126, ROM 128, etc.) via a storage interface 124. Storage interface 124 may connect to memory devices 130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 130 may store a collection of program or database components, including, without limitation, an operating system 132, a user interface application 134, a web browser 136, a mail server 138, a mail client 140, a user/application data 142 (e.g., any data variables or data records discussed in this disclosure), etc. Operating system 132 may facilitate resource management and operation of the computer system 102. Examples of operating system 132 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 134 may facilitate display, execution, interaction, manipulation, or operation of program components through textual or graphical facilities. For example, user interfaces may provide computer interaction interface elements on a display system operatively connected to computer system 102, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 102 may implement web browser 136 stored program component. Web browser 136 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 102 may implement mail server 138 stored program component. Mail server 138 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 102 may implement mail client 140 stored program component. Mail client 140 may be a mail viewing application, such as Apple Mail, Microsoft Entourage, Microsoft Outlook, Mozilla Thunderbird, etc.

In some embodiments, computer system 102 may store user/application data 142, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Figure 2:
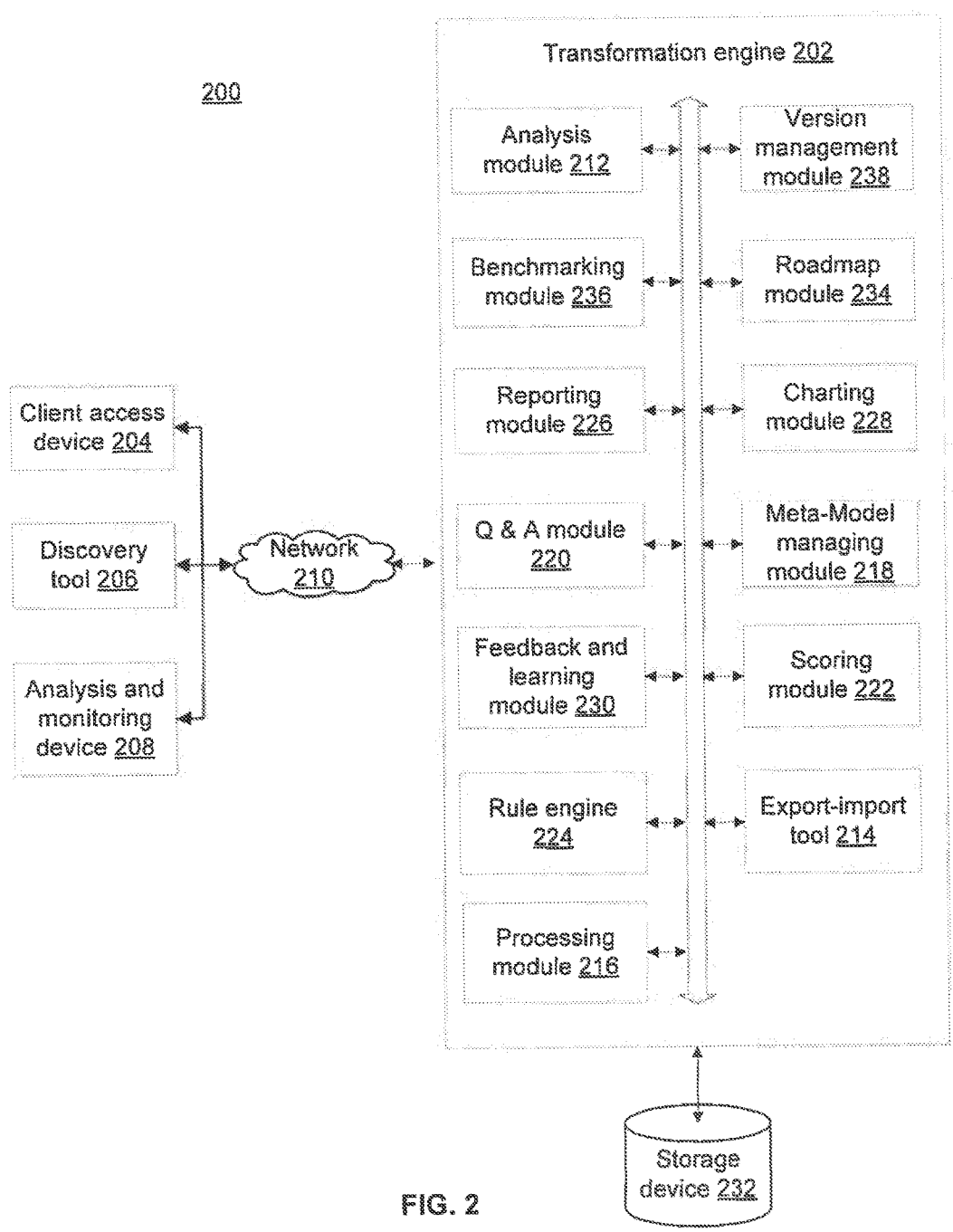
FIG. 2 is a block diagram illustrating a system for transformation of a portfolio of information stores, in accordance with an embodiment.

FIG. 2 is a block diagram illustrating a system 200 for transformation of a portfolio of information stores, in accordance with an embodiment. System 200 includes a transformation engine 202 that is in communication with a client access device 204, a discovery tool 206, and an analysis and monitoring device 208 through a network 210. Examples of network 210 may include but are not limited to Local Area Network (LAN), Wide Area Network (WAN), or the Internet. Network 210 may be a wired or a wireless network.

Client access device 204 may be an end user computing device and/or a server. Client access device 204 includes information associated with business entities or data stores associated with the portfolio of information stores. Examples of a business entity may include, but are not limited to vendors, organizations, invoices, employees, customers, sales, suppliers, sales, pricing, logistics, Human Resource (HR), terms and conditions, orders, opportunities, products, stores, contacts, configurations, and machine data (for example, turbine data in an energy company), diagnostic imaging machine (for example, ultrasound), nuclear medicine, XRay, and MR in a healthcare company.

Therefore, once one or more rationalization criteria have been determined based on business needs, the information associated with business entity or data stores is retrieved by transformation engine 202 via network 210 from client access device 204. This information is then used by an analysis module 212 within transformation engine 202. Thereafter, to capture the existing state of the portfolio of information stores, analysis module 212 communicates with discovery tool 206 which collects information related to discovery of new information stores. To further capture the existing state, analysis module 212 also communicates with an export-import tool 214 that collects data related to the existing state from external systems as well as from within system 200. Export-import tool 214 also feeds in or ingests data in system 200. In an embodiment, the analysis performed by analysis module 212 is enabled by a processing module 216 that processes data gathered from client access device 204, discovery tool 206, and export-import tool 214.

Thereafter, analysis module 212 creates a rationalization model to assess business entity information and data stores and also to identify one or more dimensions of interests associated thereon. The one or more dimensions of interests may include, but are not limited to business value, investment value, technical quality, functional value, and risk value. Analysis module 212 may communicate with a meta-model managing module 218 to create the rationalization model in the form of meta-models that include clear semantics, which can be easily mapped to the concepts, activities, and tools of standard frameworks in IT industry. Analysis module 212 then communicates with a Question and Answer (Q&A) module 220 to collect the information associated with the one or more dimensions of interest. Q&A module 220 generates a list of questions and answers that may be used by analysis module 212 to perform assessment. In an embodiment, analysis module 212 may also communicate with analysis and monitoring device 208 to automatically capture information corresponding to the one or more dimensions of interest identified. This is further explained in conjunction with FIGS. 3 and 4.

The information thus collected is used by a scoring module 222 to compute assign scores to business entity information and data stores across the one or more dimensions of interests. In an embodiment, scoring module 222 permits the management and process teams to compute the overall score based on different templates. In an exemplary embodiment, scoring may be based on a scale of 1 to 5 including decimal values. In this scenario, each scoring method may have a unique legend based on the template being completed.

After scoring is completed, analysis module 212 performs analysis on information collected by communicating with processing module 216 and a rule engine 224. Rule engine 224 provides solutions to problems identified based on the analysis performed. Consequently, rule engine 224 also verifies the solutions so provided. In an embodiment, rule engine 224 may execute one or more business rules in a runtime environment. Performing of the analysis is further explained in detail in conjunction with FIGS. 3 and 4.

The analysis so performed is used by a reporting module 226 to generate reports representative of the analysis. To this end, reporting module 226 communicate with a charting module 228 that generates charts and recommendations using the analysis. These charts and recommendations are included within the reports. This is further explained in conjunction with FIGS. 3 and 4. These reports are then fed into a feedback and leering module 230, which provides feedback on the analysis performed. The feedback thus provided leads to updating of the information used to perform the analysis. This updated information is stored in a storage device 232 and is further used by feedback and learning module 230 to employ automatic machine learning techniques without involving manual intervention. In an embodiment, storage device 232 may be a collection of a plurality of storage devices, which are internal to transformation engine 202. Alternatively, storage device 232 may be located external to transformation engine 202. Storage device 232 may include a data repository that further includes documents, data, web pages, images, and multimedia files that may be used by various modules within transformation engine 202 to enable transformation of the portfolio of assets.

After the feedback and automatic machine learning is complete, a roadmap module 234 generates a transformation roadmap for the portfolio of information stores. The transformation roadmap is then used for future assessment and transformation. In an embodiment, roadmap module 234 may communicate with a benchmarking module 236 and a version management module 238 to generate the transformation roadmap.

Benchmarking module 236 may automatically perform benchmarking with respect to information or data that is available internally within system 200 or with respect to externally available information or data. In an embodiment, benchmarking module 236 calculates averages and totals and produces weighted and/or unweighted assessments. Further, version management module 238 performs automatic versioning or baselining of states of the information stores. In an embodiment, version management module 238 compares the information stores landscape within an organization with the previous information stores landscape, which may have been captured an year earlier, in order to determine the change or difference. In another embodiment, version management module 238 checks version of information stores being used by an organization, and further provides suggestions on upgrading new version of the respectibe information stores. The result of these computations performed by benchmarking module 236 and version management module 238 are used by roadmap module 234 to generate a tranformation roadmap.

Figure 3:
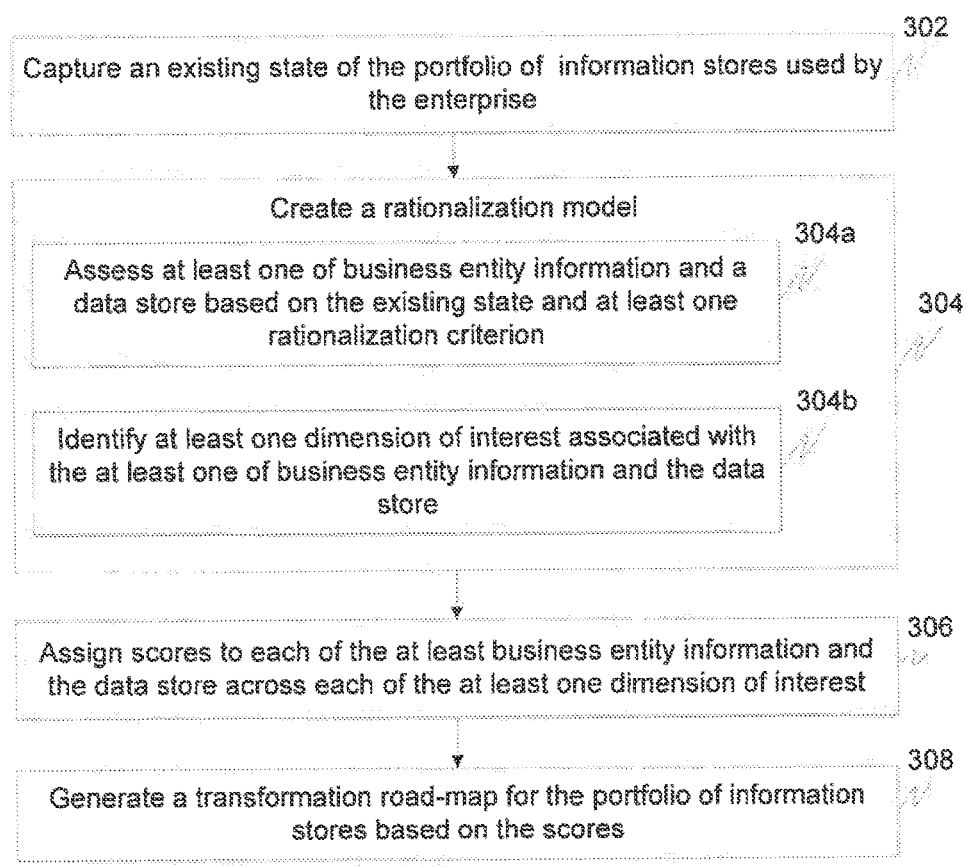
FIG. 3 illustrates a flowchart of a method for transforming a portfolio of information stores, in accordance with an embodiment.

FIG. 3 illustrates a flowchart of a method for transforming a portfolio of information stores, in accordance with an embodiment. The portfolio of information stores may include, but is not limited to data stores, data centers, and databases.

To start with, one or more rationalization criteria are determined based on business needs as captured or gathered by a project team. These one or more rationalization criteria are the drivers or the needs for rationalization of the portfolio of information stores. The one or more rationalization criteria may include but are not limited to acquisitions, mergers, dilution of a business unit, reduction of business risk, business efficiency, enhanced performance of application, portfolio, and infrastructure, integration and portability, business and portfolio alignment, architecture maturity, information or data store usefulness, and optimum resource utilization.

At 302, an existing state of the portfolio of information stores used by an enterprise is captured. In an embodiment, an inventory of database or data sources may be identified. The existing state to be captured is decided based on the one or more rationalization criteria selected. By way of an example, acquisition or merger is selected as the criterion for rationalization. After an acquisition or merger, there may be a scenario where duplication of information stores may occur because of prior use of similar information stores used by separate entities before the acquisition or merger. Some information stores might also end up being redundant. Thus, in this case, existing state of an information store would include its usability, acceptance, utilization, or familiarity within the company. By way of another example, dilution of a business unit is selected as the criteria. In this case, existing state of the information stores being used by the business unit being diluted is captured. The existing state is captured by collecting data associated with it using discovery tool 206 and export-import tool 214. Discovery tool 206 and export-import tool 214 have been discussed in conjunction with FIG. 2.

In an exemplary embodiment, one or more methods for identifying the inventory for information stores may be employed based on existing capabilities of an enterprise. These one or more methods may include, but are not limited to Configuration Management Database (CMDB) tools, Enterprise Architecture (EA) tools (for example, Sparks, Troux, Mega, and Orbus), interviews with stakeholders, auto-discovery tools which crawl the network and make a best case effort to identify applications and databases in use, and Excel spreadsheets. Data may be imported from all of these and thereafter analysis may be independently performed on the data.

After capturing the existing state of the portfolio of information stores, at 304, a rationalization model is created. The rationalization model may be created in the form of meta-models that include clear semantics, which can be easily mapped to the concepts, activities, and tools of standard frameworks in IT industry. The rationalization model is created to firstly assess one or more of business entity information and a data store based on the existing state and one or more rationalization criteria. Business entity information is associated with a business entity. Examples of a business entity may include, but are not limited to vendors, organizations, invoices, employees, customers, sales, suppliers, sales, pricing, logistics, Human Resource (HR), terms and conditions, orders, opportunities, products, stores, contacts, configurations, and machine data (for example, turbine data in an energy company), diagnostic imaging machine (for example, ultrasound), nuclear medicine, XRay, and MR in a healthcare company.

The rationalization model also identifies one or more dimensions of interests associated with the business entity information and the data store. The one or more dimensions of interests may include, but are not limited to business value, investment value, technical quality, functional value, and risk value. In an embodiment, the dimension of business value is associated with the business importance of business entity information to meet business goals. The dimension of investment value is associated with total financial cost of business entity information. This dimension may include, but is not limited to costs for purchasing, operations, and maintenance of the business entity information. Further, the dimension of technical quality is associated with data accuracy and reliability, efficiency, security, understandability, quality and response time that will influence maintenance work and use of resources for the business entity information. The dimension of functional value is associated with usage of the business entity information. The use of business entity information is a behavioral indicator which acts as a surrogate for measuring the effectiveness of the system. Lastly, the dimension of risk value is associated with one or more of, but not limited to compliance, regulatory, and vendor risk.

After identifying the one or more dimensions, scores are assigned to each of the business entity information and the data store across each of the one or more dimensions of interests at 306. In an embodiment, each business entity information and data store is assigned a score across the five dimensions described above. In an exemplary embodiment, a score in the range of 0 to 5 may be assigned to business entity information and data store across different dimensions of interests. These scores may be automatically computed by the system based on a questionnaire provided to users and answers provided by the users thereon. These scores may then be used to assign a rank to business entity information or a data store. Rank assigned to the business entity information or a data store is representative of its usefulness.

Thereafter, at 308, a transformation road-map is generated for the portfolio of information stores based on the scores. To this end, reports representative of the transformation road map may be generated. These reports include charts and recommendations associated with rationalization of the portfolio of data-stores. These recommendations may include elimination, replication, deduplication, consolidation, and migration of data or data store. The recommendations may further include suggestion as to what data or store can be moved to cloud, what data can be hosted in Open source data stores as compared to proprietary data stores, what data governance mechanisms (for example, ownership, role/responsibilities, and data integrity) need to be implemented. In an exemplary embodiment, an information store portfolio chart, generated based on transformation analysis, may indicate four categories: useful, maintain, decommission, and upgrade/migrate. In the maintain category, information stores which should be continued or maintained are indicated. In the useful category, information stores which should be further invested in are indicated. In the migrate/upgrade category, information stores which should be migrated or upgraded are indicated. In the decommission category, information stores that should be eliminated and thus discontinued from use are indicated.

To perform the transformation analysis and subsequently generate a transformation roadmap, important points to classify and identify candidates for database decommission/consolidations may include, but are not limited to categorize databases into different groups with respect to business process and functionalities, understand the subject areas for each database, type of databases (for example, OLTP, data warehouse, and data marts) and environment (for example, development, quality assurance, and production), mission critical databases with respect to Recovery Point Objective (RPO) and Recovery Time Objective (RTO), non critical databases for each database environments, Service Level Agreement (SLA) and planned maintenance for each database environment, database platform and its version, relationship between data and databases, understanding size for each database, performance requirements for each database, availability of hardware on which to consolidate, decisions on consolidation of operating environments, decision on consolidation of target Database environment, understanding redundant data with respect to entities for each subject areas, understanding enterprise integrity across data platforms and data consistency standpoint, application conversion effort, resource availability and skills availability, understanding various data sources involved, understanding existing Extract, Transform and Load (ETL) capability and compatibility with new platform, volume of ETL used specific to data warehouse and data marts environment.

In an embodiment, feedback and automatic machine learning may be employed on the charts and recommendations in the report representative of the transformation analysis. This generates a transformation roadmap for the portfolio of information stores. This transformation roadmap may also include associated cost and benefit analysis of the transformation. A transformation roadmap, may, for example, include analysis on which information stores should be tolerated, eliminated, migrated or invested upon. In an exemplary transformation roadmap, cost and benefit analysis with respect to different information stores may also be indicated.

The transformation process thus provides for auto-discovery of information stores and integration to other tools for automated collection of data. The assessments performed are objective and data driven. Capturing of benchmark data and machine learning based adjustment of information stores disposition analysis is also completely automatic. The method thus provides analysis that is performed at multiple levels on a hierarchical basis. These multiple levels include enterprise information management maturity Level, followed by business entity information level, followed by physical entity level (for example, data stores). This gives an organization a 360 degree view of how information is being managed or handled within the organization.

Figure 4:
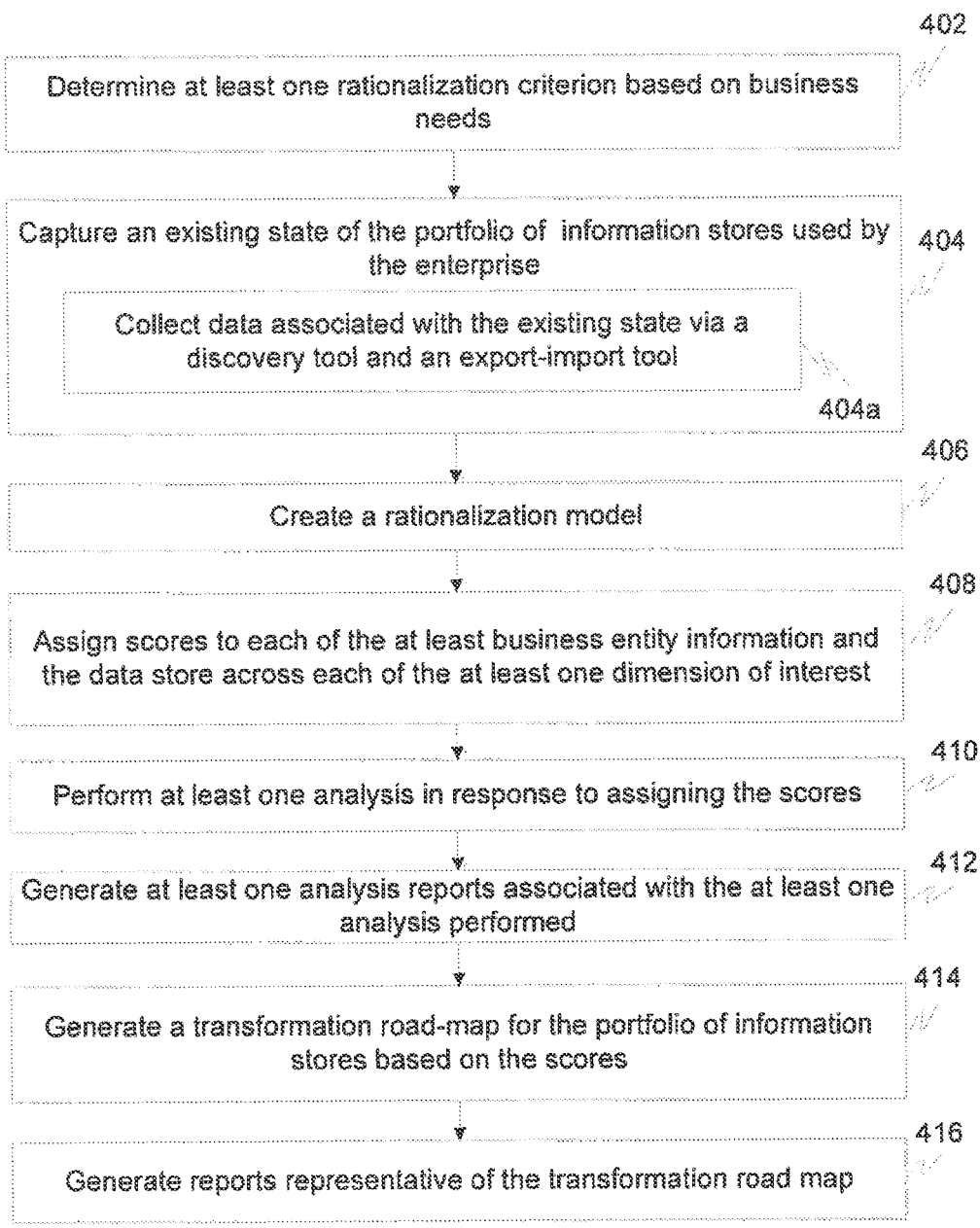
FIG. 4 illustrates a flowchart of a method for transforming a portfolio of information stores, in accordance with another embodiment.

FIG. 4 illustrates a flowchart of a method for transforming a portfolio of information stores, in accordance with another embodiment. To transform the portfolio of information stores, at 402, one or more rationalization criteria are determined based on business needs. These one or more rationalization criteria are the drivers or the needs for rationalizing the portfolio of information stores. This has been explained in conjunction with FIG. 3. Thereafter, at 404, an existing state of existing state of the portfolio of information stores used by the enterprise is captured. The existing state to be captured may be decided based on the one or more rationalization criteria. Capturing the existing state includes, collecting, at 404a, data associated with the existing state of the portfolio of information stores. This data is collected by discovery tool 206 and export-import tool 214. This has been explained in conjunction with FIG. 2.

Thereafter, a rationalization model is created at 406. At 408, scores are assigned to each of the business entity information and the data store across each dimension of interest. This has been explained in conjunction with FIG. 3. At 410, one or more analysis in performed in response to assigning the scores. The one or more analysis may include, but are not limited to database/business entity information rationalization, data governance report (for data ownership, roles and responsibility), data quality report (for integrity and redundancy), purge and archival (for strategy and blueprint), RDBMS consolidation assessment report (for database consolidation approach and blueprint), database hardware/software tech refresh recommendations and roadmap, database backup, recovery and replication recommendations. At 412, one or more analysis reports representative of the one or more analysis performed are generated. Thereafter, a transformation road-map is generated for the portfolio of information stores based on the scores at 414. This has been explained in detail in conjunction with FIG. 3.

Various embodiments of the invention provide methods and system for information store transformation. The transformation process is web enabled, repository supported, and modular. The transformation process also provides support for auto-discovery of applications and integration to other tools for automated collection of data. The assessments performed are objective and data driven. Moreover, the framework for generating transformation roadmap is highly customizable and generic. It further provides for automated capture of benchmark data and automatic machine learning based adjustment of application disposition analysis. Weights are also adjusted automatically over a period of time by analysis. Additionally, disclosed methods and system help an organization to perform continual transformation, which is useful in case of frequent mergers and acquisitions. The system also does benchmarking and version management in order to make data with respect to continuum of transformation available.

The specification has described methods and systems for information store transformation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for transforming a portfolio of information stores in an enterprise, the method comprising:
    capturing, by a transforming device, an existing state of the portfolio of information stores used by the enterprise based on at least one rationalization criterion,
       wherein the existing state of the portfolio of information stores corresponds to a new version of the portfolio of information stores, and
       wherein the new version of the portfolio of information stores is determined based on a comparison of information stores landscape within the enterprise with previous information stores landscape of the enterprise;
    creating, by the transforming device, a rationalization model to:
    assess at least one of business entity information and a data store based on the existing state and the at least one rationalization criterion; and
    identify at least one dimension of interest associated with the at least one of business entity information and the data store;
    assigning, by the transforming device, scores to each of the at least business entity information and the data store across each of the at least one dimension of interest;
    performing, by the transforming device, at least one analysis in response to assigning the scores;
    generating, by the transforming device, at least one analysis reports comprising solutions to problems identified based the at least one analysis performed, wherein the solutions are verified based on one or more business rules; and
    generating, by the transforming device, a transformation road map for the portfolio of information stores based on the scores.

2. The method of claim 1 further comprising assigning a rank to at least one of the business entity information and the data store based on scores assigned to the business entity information and the data store across each dimension of interest.

3. The method of claim 2, wherein the rank assigned to the at least one business entity information and the data store is representative of usefulness of information associated with the business entity information and the data store.

4. The method of claim 1 further comprising determining the at least one rationalization criterion based on business needs.

5. The method of claim 1, wherein the at least one rationalization criteria is selected from a group comprising acquisitions, mergers, dilution of a business unit, reduction of business risk, business efficiency, enhanced performance of an application, portfolio, and infrastructure, integration and portability, business and portfolio alignment, architecture maturity, usefulness of information store, and optimum resource utilization.

6. The method of claim 1, wherein capturing the existing state comprises collecting data associated with the existing state via a discovery tool and an export-import tool, the discovery tool collecting data comprising discovery of the new data-stores, and the export-import tool collecting data from external and internal systems.

7. The method of claim 1 further comprising generating reports representative of the transformation road map, the reports comprising charts and recommendations associated with rationalization of the portfolio of data-stores.

8. The method of claim 7, wherein the recommendations associated with rationalization comprises data or data store elimination, business entity information elimination, replication, deduplication, consolidation, maintain, decommission, re-model, and migration.

9. The method of claim 1, wherein a business entity is selected from a group comprising vendors, organizations, invoices, employees, customers, sales, suppliers, sales, pricing, logistics, and Human Resource (HR), terms and conditions, orders, opportunities, products, stores, contacts, configurations, machine data, nuclear medicine, XRay, MR in a healthcare company.

10. The method of claim 1, wherein a dimension of interest is selected from a group comprising business value, investment value, technical quality, functional value, and risk value.

11. A transforming device comprising:
    at least one processor; and
    a memory storing instructions that, when executed by the at least one processor, cause the at least one processor to perform operations comprising:
    capturing an existing state of the portfolio of information stores used by the enterprise based on at least one rationalization criterion,
       wherein the existing state of the portfolio of information stores corresponds to a new version of the portfolio of information stores, and
       wherein the new version of the portfolio of information stores is determined based on a comparison of information stores landscape within the enterprise with previous information stores landscape of the enterprise;
    creating a rationalization model to:
    assess at least one of business entity information and a data store based on the existing state and at least one rationalization criterion; and
    identify at least one dimension of interest associated with the at least one of business entity information and the data store;

assigning scores to each of the at least business entity information and the data store across each of the at least one dimension of interest;

performing at least one analysis in response to assigning the scores; generating at least one analysis reports comprising solutions to problems identified based the at least one analysis performed, wherein the solutions are verified based on one or more business rules; and generating a transformation road map for the portfolio of information stores based on the scores.

12. The transforming device of claim 11, wherein the operations further comprise assigning a rank to at least one of the business entity information and the data store based on scores assigned to the business entity information and the data store across each dimension of interest.

13. The transforming device of claim 12, wherein the rank assigned to the at least one business entity information and the data store is representative of usefulness of information associated with the business entity information and the data store.

14. The transforming device of claim 11, wherein the operations further comprise determining the at least one rationalization criterion based on business needs.

15. The transforming device of claim 14, wherein the at least one rationalization criteria is selected from a group comprising acquisitions, mergers, dilution of a business unit, reduction of business risk, business efficiency, enhanced performance of an application, portfolio, and infrastructure, integration and portability, business and portfolio alignment, architecture maturity, usefulness of information store, and optimum resource utilization.

16. The transforming device of claim 11, wherein the operation of capturing the existing state comprises operation of collecting data associated with the existing state via a discovery tool and an export-import tool, the discovery tool collecting data comprising discovery of the new data-stores, and the export-import tool collecting data from external and internal systems.

17. The transforming device of claim 11, wherein the operations further comprise generating reports representative of the transformation road map, the reports comprising charts and recommendations associated with rationalization of the portfolio of information stores.

18. The transforming device of claim 17, wherein the recommendations associated with rationalization comprises data or data store elimination, business entity information elimination, replication, deduplication, consolidation, maintain, decommission, re-model, and migration.

19. A non-transitory computer readable medium having stored thereon instructions for transforming a portfolio of information stores in an enterprise comprising executable code which when executed by a processor, causes the processor to perform steps to and that comprise:

capture an existing state of the portfolio of information stores used by the enterprise based on at least one rationalization criterion, wherein the existing state of the portfolio of information stores corresponds to a new version of the portfolio of information stores, and wherein the new version of the portfolio of information stores is determined based on a comparison of information stores landscape within the enterprise with previous information stores landscape of the enterprise;

create a rationalization model to:

assess at least one of business entity information and a data store based on the existing state and at least one rationalization criterion; and identify at least one dimension of interest associated with the at least one of business entity information and the data store;

assign scores to each of the at least business entity information and the data store across each of the at least one dimension of interest;

perform at least one analysis in response to assigning the scores;

generate at least one analysis reports comprising solutions to problems identified based the at least one analysis performed, wherein the solutions are verified based on one or more business rules; and generate a transformation road map for the portfolio of information stores based on the scores.

* * * * *